United States Patent [19]
Lau

[11] 3,765,714
[45] Oct. 16, 1973

[54] VERSATILE MOBILE HOME
[76] Inventor: Dicksen T. W. Lau, 450 17th Ave., San Francisco, Calif. 94121
[22] Filed: Jan. 19, 1972
[21] Appl. No.: 218,874

[52] U.S. Cl. .................................. 296/23 R, 52/143
[51] Int. Cl. .............................................. B60p 3/32
[58] Field of Search ...................... 296/23 R; 52/143, 52/79; 296/31 R

[56] References Cited
UNITED STATES PATENTS

| | | | |
|---|---|---|---|
| 3,119,638 | 1/1964 | Sneed | 296/23 R |
| 2,363,259 | 11/1944 | Penton | 296/23 R |
| 2,687,896 | 8/1954 | Kinsman | 296/23 R |
| 3,147,336 | 9/1964 | Mathews | 296/31 R |
| 2,256,038 | 9/1941 | Woodruff | 296/23 R |
| 3,157,427 | 11/1964 | Reynolds | 296/23 R |

*Primary Examiner*—Philip Goodman
*Assistant Examiner*—John A. Carroll

[57] ABSTRACT

A Versatile Mobile Home comprises a combination of sections which can be disassembled and rearranged in any order at the discretion of the owner. Said sections can be added one after another to the combination and also can be taken away from the combination as the situation requires. Each section provides facilities to be used an an independent living unit. The sections can be hauled from place to place either separately one by one by an automobile or jointly as a train by a truck.

3 Claims, 14 Drawing Figures

Patented Oct. 16, 1973

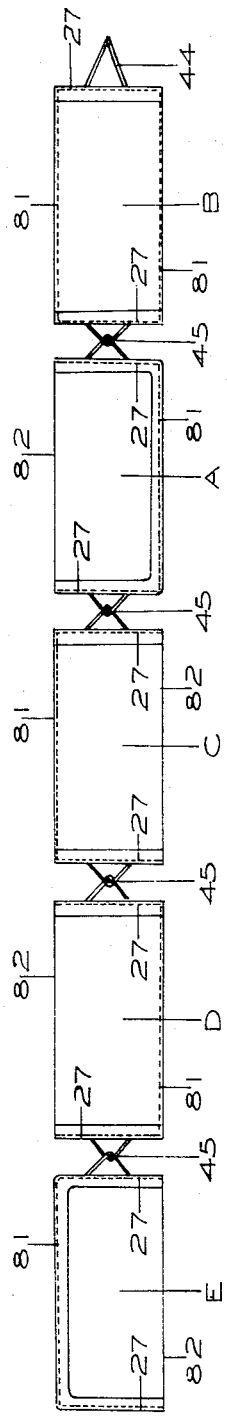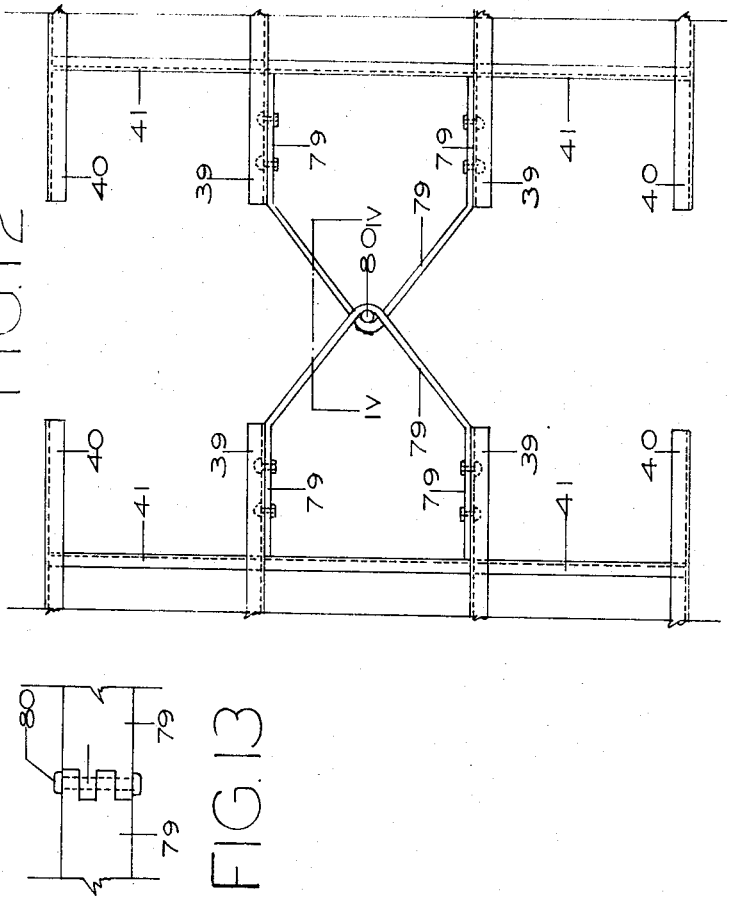

VERSATILE MOBILE HOME

This invention relates to a versatile mobile home made up of a plurality of independent sections each providing facilities to be used as a living unit. Said living unit may be a kitchen, a bathroom, a bedroom, a dining room or a living room. It may also be any combination of them.

One of the principal objects of this invention is to make the mobile homes to be really mobile. The conventional mobile homes are not mobile at all even though they are equipped with wheels and being called "mobile." In the United States only one out of six mobile homes ever moves from its original site. The remaining 83 percent of mobile homes never move from their sites since they were placed there. Therefore many manufacturers have an inclination to play down the mobile image and call them the relocatable homes. Some people consider these mobile homes as dwelling modules. An architect even calls the 60 feet by 12 feet by 10 feet mobile home as "the twentieth century brick" which has completely eliminated the mobile image of the mobile homes. A versatile mobile home possesses very high mobility because its sections can be easily detached and hauled one by one separately from place to place by an automobile and they can also be rearranged in different orders and hauled away simultaneously by a truck.

Another principal object of this invention is to make the mobile homes to become more versatile. The owner of a conventional mobile home cannot change its size and arrangement of its rooms from time to time as he pleases. But the owner of a versatile mobile home can. When he needs more rooms for his family, he can expand his home simply by attaching additional sections to his versatile mobile home. When he does not need a large home any more, he can reduce his living space by removing sections from his versatile mobile home and put them up for sale.

Still another object of this invention is to make it feasible to convert a portion of one's residence into travelling facilities. The versatile mobile home is not only a comfortable home for a family to live, but also provides a less expensive means for a family to travel. American people like to go to hunting in the mountains, to fishing in the lakes or on touring trips around the country either by themselves or with their families. But for many times they have to stay at home because they can not afford the high costs of staying in motels and of eating in restaurants during their travelling. With this invention, a person simply disconnects a section equipped with kitchen, bath and sleeping facilities from his versatile mobile home and hauls it along on his trips by his automobile.

A further important object of this invention is to reduce the various losses suffered by a person who is tranferred to another position at a distant plate. The twentieth centry is a new nomadic epoch. People keep moving to the places where better jobs are offered. When a person is notified to be transferred to another location, the first thing for him and his family to do is to pack up all the things to be moved. In the meantime he may hire a realtor to sell his house. When the packages are ready for shipment, he may have to put his family in a hotel for a few days. When he and his family arrive at the new location, they have to stay in a hotel to wait for their packages to arrive.

The compensation from his employer for the moving expenses may never be enought to cover all the expenses incurred in the transfer. If he looks for another house in the new location to move in, he may also suffer double losses because of unexpected fluctuation in prices of homes in the two locations. A person who lives in a versatile mobile home does not have these disadvantages. When he is ready to leave, he disassembles his versatile mobile home into sectons and attach them to each other to form a train of sections. Then he hires a truck to haul the train of sections along with his family on board to the new location. By this way he not only saves very much moving expenses, but also eliminates all the troubles of packing and unpacking things, moving in and enough of hotels, selling and buying homes and all other losses.

A still further object of this invention is to enable the owners of the mobile home to acquire up-to-date accommodations and modern comforts without much difficulty. When the owner of a versatile mobile home wants to replace his outmoded bathroom by a modern bathroom, what he has to do is to trade in the section equipped with the outmoded bathroom for a new section furnished with a modern bathroom. The same measure can be applied to the kitchen, dining room, living room and bedrooms in his versatile mobile home. By this invention a person can live in a home with luxuries and comforts adaptable to his financial circumstances.

Other objects and advantages inherent in this invention beyond those set out above will become apparent from the following detail description and claims taken in conjunction with the drawings in which like numerals indicate like elements.

FIG. 11 shows the construction of a hauling frame and its connection to the chassis of a section of a versatile mobile home.

FIG. 12 shows the construction of a connecting link used to connect the sections of a versatile mobile home during hauling.

FIG. 13 is a side view of the connecting link indicated at IV — IV in FIG. 12.

FIG. 14 illustrates one arrangement of one sections of a versatile mobile home shown in FIG. 1 to be connected in succession to form into a train of sections for hauling.

Figure 1:
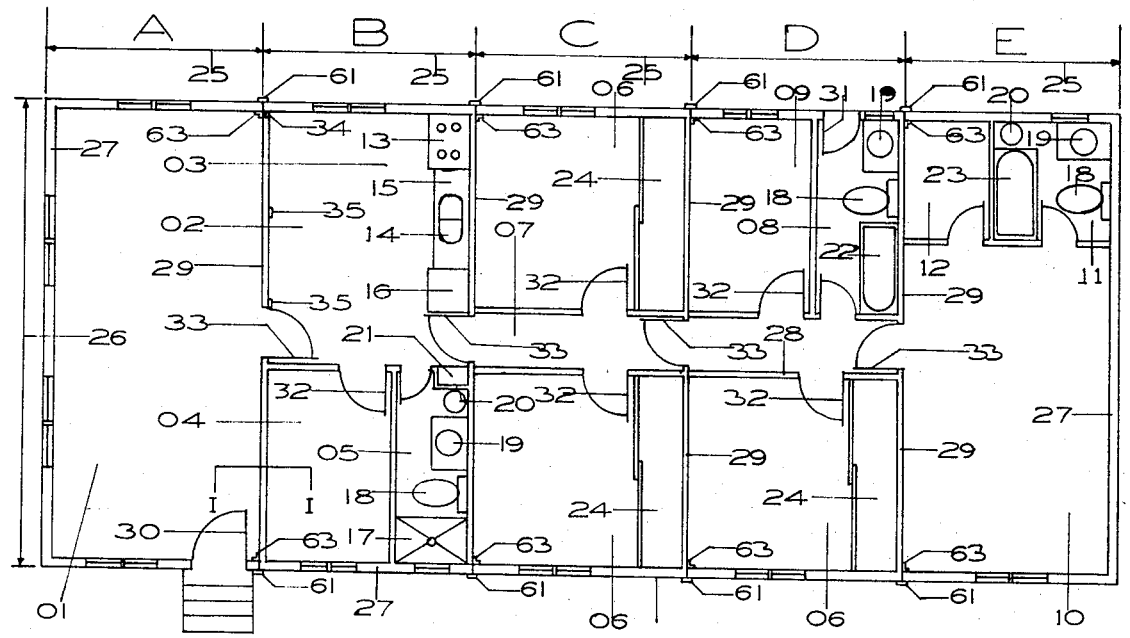
FIG. 1 shows one layout of a versatile mobile home.
Figure 2:
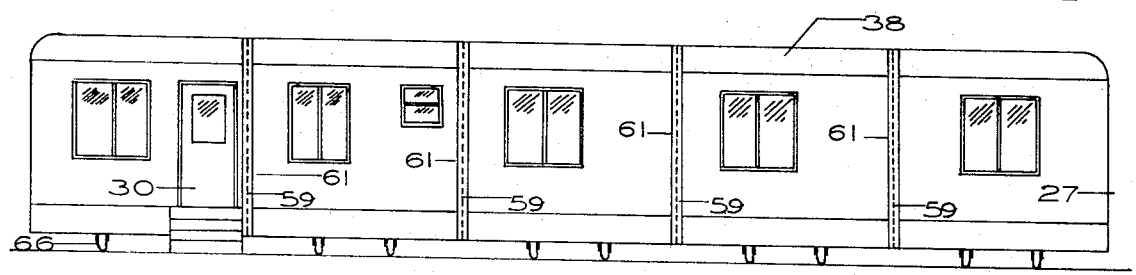
FIG. 2 is a side elevation of the versatile mobile home shown in FIG. 1.

With reference to FIG. 1, the versatile mobile home is divided into five sections; namely, Section A, Section B, Section C, Section D and Sectio E. Section A is completely for living room 01. Section B consists of one dining area 02, one kitchen 03, one bedroom 04 and one bathroom 05. Section C has two bedrooms 06 and a hallway 07. Section D is made up of one bedroom 06, a hallway 07, one bathroom 08 and a den 09 which can be converted into a study or a bedroom. Section E comprises a master bedroom 10, an attached bathroom 11 and a walk-in closet 12. The kitchen is provided with a range 13, a sink cabinet with a double sink 14 on top, a dishwasher 15 underneath and wall cabinets overhead and a refrigerator 16. Bathroom 05 has a shower 17, a toilet 18, a basin 19, a water heater 20 and a washer-dryer combination 21. Bathroom 08 has a toilet 18, a basin 19 and a bathtub 22. Bathroom 11 has a toilet 18, a basin 19, a waterheater 20 and a bathtub-shower combination 23. Each bedroom has a wardrobe 24. The length and width of a section are indicated by the numerals 25 and 26 respectively.

Walls 27 are used as exterior walls and walls 28 are used as interior walls only. But walls 29 can be used either as interior walls or as exterior walls. There are two walls 29 in section B and one in Section C and Section D. The main entrance 30 and the back door 31 are situated near the two ends of the versatile mobile home. Doors 32 are only used as interior doors but doors 33 can be used as either interior or exterior doors. Th portion of wall 29 between the living room and the dining area is movable. It is attached to the exterior wall 27 at the outer end by hinges 34. By means of the latches 35 it is held at the middle and the inner end to the floor 36 and ceiling 37. When the latches are disengaged, this portion of wall 29 can be swung to the living room and leaned against the exterior wall 27. This will combine the living room with the dining area into a more spacious room.

Figure 3:
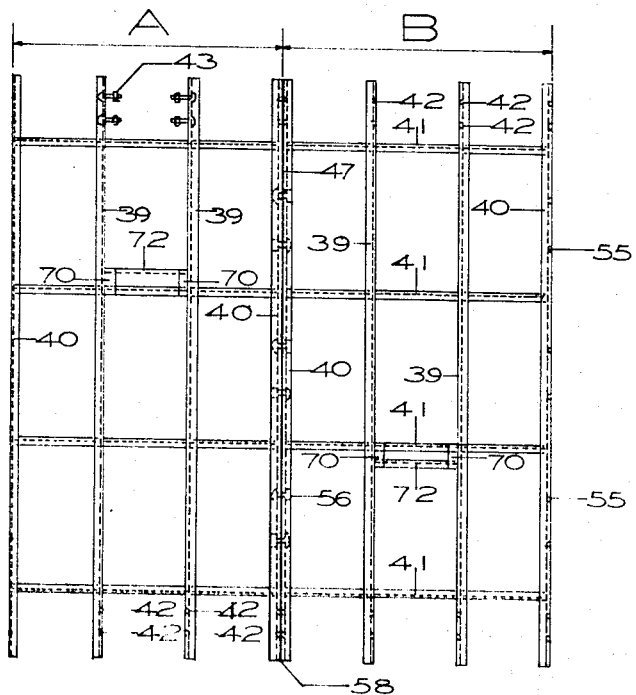
FIG. 3 illustrates the construction of the chassis and the joint between the chassis of Section A and Section B in FIG. 1.

As illustrated in FIG. 3, each section of a versatile mobile home has a chassis made up of four equidistantly spaced steel girders, two inner girders 39 and two outer girders 40, which run transversely to the longitudinal axis of the versatile mobile home. The twelve floorbeams 41 which are parallel to the longitudinal axis of the versatile mobile home are welded to the girders 39 and 40. The girders and floorbeams may be made of stell channels. At both ends of the steel girders, bolt holes 42 and steel bolts 43 are provided for the attachment of the hauling frame 44 and connected links 45 while hauling.

Figure 4:
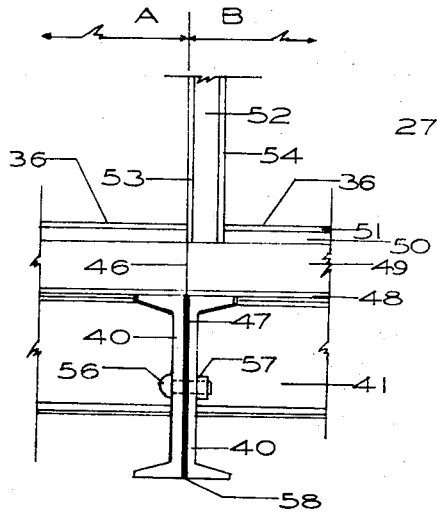
FIG. 4 illustrates the connection between the floors of two adjacent sections as indicated at I — I in FIG. 1.

Joint 46 between the floors and joint 47 between the chassis of the two adjacent sections, Section A and Section B, are shown in FIG. 4. Th floor 36 is made up of aluminum underskin 48, floor joinsts 49, plywood floor 50 and floor covering 51. The edges of the floors are square and flush with the webs of the outer girders 40. The wall 29 which is made up of stud 52 with heavy gauge prefinished aluminum exterior 53 on the outside and vinyl shield paneling 54 on the inside is framed into the flooring of Section B on one side of joint 46. The stell channels of outer girders 40 with their flanges facing inwardly are provided with bolt holes 55, bolts 56 and nuts 57. A lining made of resilient materials 58 is placed between the webs of the two adjacent girders 40. When the bolts 56 are tightened by nuts 57, the edges of the two adjacent floors 36 will be brought into close contact and by means of the resilient lining, joint 47 will become very rigid and tight.

Figure 5:
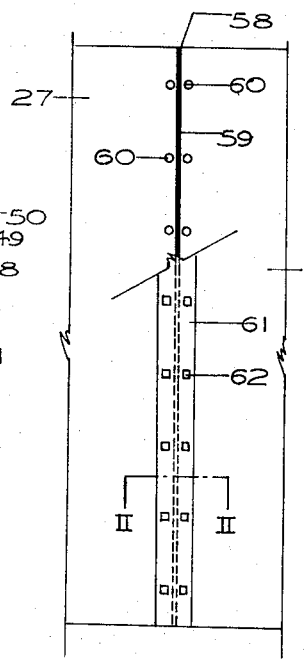
FIG. 5 illustrates the joint between two walls of the same thickness of two adjacent sections in a versatile mobile home.
Figure 6:
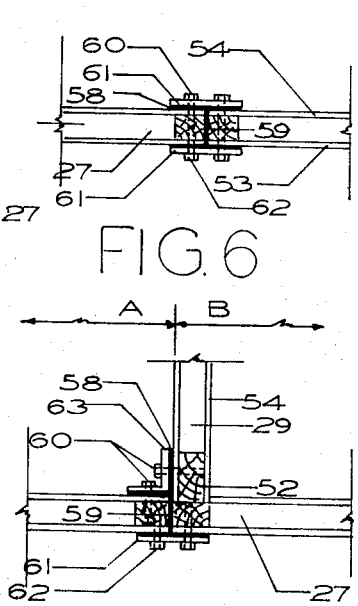
FIG. 6 is the sectional view indicated at II — II in FIG. 5.

FIG. 5 and 6 illustrate the connection of two walls in the same plane. The edges of the walls to be connected at the vertical joint 59 are even and square and also lined with resilient material 58. Small bolts 60 are firmly fixed on the inside and outside faces of the walls on both sides of vertical joint 59. Metal plates 61 which length is equal to the height of the walls are made of the same material as the exterior skin of the walls. There are two columns of bolt holes on each metal plate 61. The size and arrangement of these bolt holes must match the bolts 60 on the walls. The two walls are connected together thus: Two metal plates 61 are placed over the vertical joint 59 on both faces of the walls. The small bolts 60 on the inside faces of the walls are fitted into the bolt holes of one metal plate 61 and the small bolts 60 on the outside faces of the walls are fitted into the bolt holes of another metal plate 61. Then turn the small nuts 62 on the bolts 60 very tightly. The metal plates 61 are also lined with resilient material 58 on the inside faces which will make the vertical joints 59 to become waterproof.

Figure 7:
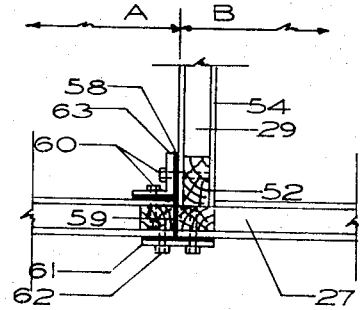
FIG. 7 shows the joint on the exterior walls between Section A and Section B in FIG. 1 where another wall framed perpendicularly to the exterior wall in Section B.

The connection of three walls with one wall framed perpendicularly to the ends of the other two walls which are in the same plane is shown in FIG. 7. This type of connection is illustrated by the vertical joint between Section A and Section B in FIG. 1. In this case the bolts 60, instead of being fixed on the inside face of exterior wall 27 of Section B, are fixed on the outside face of wall 29 which is perpendicular to the exterior wall 27 in Section B beside the joint. The metal plates 61 described above can not be used on the inside face of this type of joints. They are substituted by metal angles 63 lined with resilient materials on the contact faces.

Figure 8:
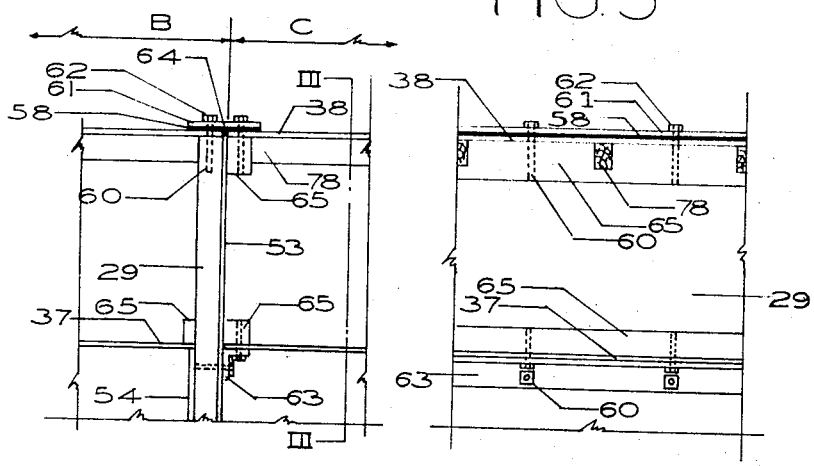
FIG. 8 shows the joints on the roof and on the ceiling between Section B and Section C in FIG. 1.
Figure 9:
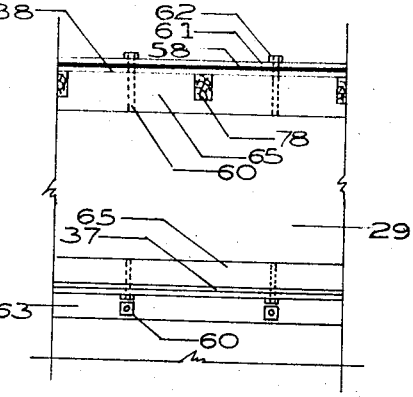
FIG. 9 shows the sectional view indicated at III — III in FIG. 8.

FIGS. 8 and 9 show the joints of two adjacent sections on the roof and the ceiling. Th joint 64 on the roof in similar to those on the walls except that only one metal plate 61 is used over the joint on top of the roof 38. The underside of the metal plates 61 used on the roof is also lined with rubber or other resilient material in order to make th joint 64 waterproof. The ceiling 37 is connected to wall 29 by means of metal angle 63 and bolts 60 fixed on wall 29 under the ceiling. The roofs and ceilings are supported by joints 65 and rafters 78.

Figure 10:
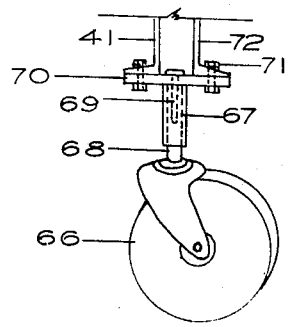
FIG. 10 shows the construction of a castor-type wheel.

A five-section versatile mobile home will have five pairs of castor-type wheels staggered between its two sides. The staggered wheels will give balance support to the versatile mobile home while standing. A castor-tupe wheel is mounted on a swivel frame which is made up of an outer tube 67, a turning shaft 68, an anchoring pin 69, a bearing plate 70 and the anchoring bolts and nuts 71 as shown in FIG. 10. An auxiliary floorbeam 72 is required for the installation of a pair of castor-type wheels under the chassis as shown in FIG. 3. Because the turning shaft 68 can turn freely to any direction, the sections of a versatile mobile home can be maneuvered to any position very easily during the formztion or rearrangement of the combination.

The hauling frame 44 shown in FIG. 11 can be used to haul a versatile mobile home either section by section separately or all sections connected together simultaneously. A hauling frame consists of two pulling bars 73, two bent bars 74 and a spacing bars 75 and all are made of steel and welded to one another. At one end the pulling bars are welded to a steel plate 76 which has a hole at the center for the connecting pin 77 to attach the hauling frame to an automobile or a truck. At the other end the pulling bars are provided with bolt holes through which and the bolt holes 42 in the inner girders 39, the steel bolts 43 connect them to the chassis of a section in the versatile mobile home. The two bent bars 74 are bent near the ends to form two legs which are also provided with bolt holes. These two legs are connected by bolts 43 to the outer girders 40 of said chassis. The spacing bar 75 is used to keep the two pulling bars in position so the load from the section will be distributed equally in the two pulling bars. Only one hauling frame 44 is required for a versatile mobile home. When the owner of a versatile mobile home wants to take his family on a vacation trip, he only pulls Section B out and hauls it along by his automobile. Section A will be pushed towards the rest of the versatile mobile home and connected to them. With a few sleeping bags on the dining area, this will give him and his family a relatively comfortable but much less expensive accommodation on their journey.

The connecting links 45 are used to attach the sections of a versatile mobile home to one another in succession while they are hauled simultaneously. A connecting link is made up of two steel bars 79 and a central pin 80. The steel bars 79 have a curve portion at the center and two straight legs at the ends. By means of the bolt holes provided in the legs of its two steel bars, together with the bolt holes 42 and steel bolts 43 in the inner girders 39, the connecting link connects the two successive chassis of a versatile mobile home as shown in FIG. 12. The curve portions of the two steel bars 79 overlap each other around a central pin 80 to act like a hinge as shown in FIG. 13. This will make the two steel bars 79 free to revolve around the central pin while the versatile mobile home is being hauled along the curves of the roads.

The connections of the hauling frame are connecting links to the sections of a five-section versatile mobile home during hauling are illustrated in FIG. 14. The order of the sections is alterable. Though the castor-type wheels of a versatile mobile home are staggered in pairs between its two sides while it is standing, however, the castor-type wheels under each section must be set near its rear while it is hauled on the road. A section may have one built-in wall 29 only on one end as in Sections A, C, D and E or two built-in walls 29 on both ends as in Section B. The end of a section with a built-in wall is indicated by the numeral 81 and the end without a built-in wall is indicated by the numeral 82. The ends without built-in walls will be covered with sheets of burlap while the versatile mobile home is being hauled on the roads.

This invention is new and unique because the versatile mobile homes can expand and shrink as the situations command. A bachelor or a thrifty young couple without children can go by with only a Section B which consists of one small bedroom, one bathroom, on dining area and a kitchen. In this case, door 3 at the dining area becomes the main entrance and the other door 33 in this section becomes the back door. If the young couple needs a moderate living room to entertain their friends, then they can add a Section A to their Section B. When the couple have a baby but their income does not allow them to move into a larger home, they can add either a Section C or a Section E to the Section B which they already had. When their financial condition is improved, they can have a living room by adding a Section A to their original combination. If they have more children and need more space for their family, they simply add more sections to their versatile mobile home. When the situation reverses, their versatile mobile home also can shrink. After their children have grown up and left home one by one, the sections of their versatile mobile home can be taken away one after another and put up for sale. For an elder couple, sometimes Section B alone may be sufficient. Therefore a versatile mobile home can be enlarged to a larger home when the family grows and also can be reduced to a smaller home when the family shrinks.

The versatile mobile homes are distinguished from other mobile homes and trailers by three unique characteristics. First, a versatile mobile home consists of a plurality of independent sections each of which provides facilities to be used as a living unit which may include one or more of the following: A kitchen, bathroom, bedroom, dining room, living room or the like in a home. Secondly, the dimensions of the sections are determined by the geometric forms of the highways whereon the versatile mobile homes will travel the most. The length of a section is the measurement taken along the longitudinal axis of the versatile mobile home. The width of a section is the measurement taken transversely to the longitudinal axis of the versatile mobile home. The maximum length of a section will be equal to the width of a standard traffic lane of said highways. When a section is moved from one place to another place, it is towed in side-to-side relationship with one side in the front and the other side in the rear. The maximum width of a section will have such a measurement when the section is towed sidewise on the highways, it can negotiate the curves of said highways well. Finally, each section of a versatile mobile home has an independent structure. Said independent structure is made up of a substructure and a superstructure. When a versatile mobile home is parking, the independent structures of its sections are joined together end-to-end by means of metal plates, bolts and nuts to make up a home. When said versatile mobile home is being towed on the roads, the substructures of its sections are connected to one another side-by-side by means of connecting links to form a train of sections.

While the preferred form of the invention has been described and illustrated herein, it will be understood that numerous changes or modifications in the shape, size arrangement and materials may be made without departing from the spirit and scope of the invention as claimed hereinafter.

What is claimed is:

1. A versatile mobile home comprising a plurality of independent sections each providing facilities to be used as a living unit such as bedroom, dining room, living room, bathroom, kitchen or the like in a home and having an independent structure consisting of a substructure, a superstructure and connecting means, said substructure including a chassis supported on a pair of castor-type wheels, said chassis made up of four equidistantly spaced steel girders, two on the inside and two on the outside, running transversely to the longitudinal axis of said versatile mobile home and a plurality of floorbeams welded perpendicularly to said steel girders, said steel girders equipped with bolt holes at their ends for the connections of hauling frame and connecting links during towing, said two outside steel girders having bolt holes along their webs for connections to substructures of adjacent sections when parking, said superstructure including walls made up of studs with heavy gauge prefinished aluminum on the outside and vinyl shield panelling on the inside, doors and windows of various sizes, waterproofing roof and insulated ceiling, and floor made up of aluminum underskin, floor joists, plywood flooring and floor covering, said connecting means including metal plates, bolts and nuts joining the sections together and resilient linings to keep these joints watertight.

2. A versatile mobile home as defined in claim 1 wherein each of said sections has a length and width measured along and transversely to the longitudinal axis of said versatile mobile home respectively, said section length equal to the width of a standard traffic lane of the highways whereon said versatile mobile home traveling most, said section width having a measurement capable to negotiate the curves of said highways well, said sections connected side-to-side as a train by means of a plurality of connecting links when being towed by a hauling frame on the highways and joined to one another end-to-end by means of metal plates, bolts and nuts to make up a home while parking.

3. A versatile mobile home as defined in claim 1 wherein said connecting means comprises metal plates, bolts, nuts and resilient linings, said metal plates, bolts and nuts joining the superstructures of adjacent sections together with resilient lining to keep the joints watertight, said bolts and nuts through the bolt holes provided along the webs of the two outside steel girders joining the substructure of adjacent sections together, said sections being assembled by means of said connecting means into a variety of combinations and sizes, said combinations capable to be disassembled, rearranged and then assembled again in any order very easily.

* * * * *